United States Patent [19]

Brush, Jr. et al.

[11] Patent Number: 4,805,290

[45] Date of Patent: Feb. 21, 1989

[54] BLOW MOLDING OF DOUBLE-WALLED BOX IN DIAGONAL HALVES

[75] Inventors: John D. Brush, Jr., Webster; Patrick J. Beattie, West Henrietta, both of N.Y.

[73] Assignee: John D. Brush & Co., Inc., Rochester, N.Y.

[21] Appl. No.: 96,600

[22] Filed: Sep. 11, 1987

Related U.S. Application Data

[63] Continuation of Ser. No. 828,243, Feb. 10, 1986, abandoned.

[51] Int. Cl.⁴ .................. B29C 49/00; B29C 49/22
[52] U.S. Cl. ........................... 29/434; 29/463; 29/525; 29/525.1; 264/523; 264/530; 264/154; 264/269; 264/510; 264/512
[58] Field of Search ............... 264/523, 530; 29/434, 29/463, 455 R, 525, 526 R, 154, 269, 510, 512; 220/4 B, 4 E, 337, 244, 334, 68, 76, DIG. 12, DIG. 14, 902

[56] References Cited

U.S. PATENT DOCUMENTS

| | | |
|---|---|---|
| 2,034,182 | 3/1936 | Harris .................... 220/4 B |
| 3,095,965 | 7/1963 | Stahl et al. .............. 220/337 |
| 3,334,164 | 8/1967 | Samuels et al. . |
| 3,372,429 | 3/1968 | Kato . |
| 3,452,125 | 6/1969 | Schurman et al. . |
| 3,477,095 | 11/1969 | Lensky ..................... 29/434 |
| 3,636,151 | 1/1972 | Nagai . |
| 3,736,201 | 5/1973 | Teraoka . |
| 3,746,204 | 7/1973 | Nagai . |
| 3,944,643 | 3/1976 | Sato et al. . |
| 4,029,234 | 6/1977 | Johnson, Jr. et al. . |
| 4,035,461 | 7/1977 | Korth . |
| 4,423,000 | 12/1983 | Teraoka . |
| 4,510,116 | 4/1985 | Peters et al. . |

FOREIGN PATENT DOCUMENTS 1470759 2/1967 France ................. 220/4 E

Primary Examiner—Jan H. Silbaugh
Assistant Examiner—Hubert C. Lorin
Attorney, Agent, or Firm—Stonebraker, Shepard & Stephens

[57] ABSTRACT

A generally rectangular, double-walled box 10 is blow molded in a pair of separately formed diagonal halves 10a and 10b, each including adjoining side walls 11 and 12 subtending a diagonal half of the bottom 15 of box 10. Walls 11 and 12 of each diagonal half are oriented obliquely to the parting plane 43 of a mold 40 that has a cavity 42 and core 41 for forming the inner and outer walls of each box half 10a and 10b. The halves are assembled together along a junction region 13 and 14, preferably so as to trap a hinged cover 20. By filling the interwall cavities of the box with a suitable insulation material, the box can be used for fire resistant storage or cold storage.

19 Claims, 3 Drawing Sheets

BLOW MOLDING OF DOUBLE-WALLED BOX IN DIAGONAL HALVES

RELATED APPLICATIONS

This application is a continuation of parent application Ser. No. 828,243, filed Feb. 10, 1986, entitled BLOW MOLDING OF DOUBLE-WALLED BOX IN DIAGONAL HALVES, and abandoned upon the filing of this continuation application.

BACKGROUND

The usual way of blow molding double-walled boxes limits their depth to one-half their narrowest width, which also limits their potential uses. Although several suggestions have been made for overcoming this limitation, none of them have been practically successful for deep boxes.

We have discovered a way of molding a generally rectangular double-walled box in two halves that can be oriented relative to a mold cavity and core so that the usual depth limitation does not apply. Our box halves can be joined together to form a completed box with ample depth, and a hinged cover for the box can be trapped between the assembled box halves. The many possible uses for such a box include filling its interwall spaces with fire resistant insulation to make a fire resistant box or filling with thermal insulation to make an ice box.

SUMMARY OF THE INVENTION

Our way of making a double-walled box having a depth-to-width ratio greater than 0.5 is to separately blow mold diagonal halves of the box so that the walls of each box half are oriented obliquely to the parting plane of a mold having a cavity and core. We prefer that the bottom and both side walls of each diagonal half all be oriented about 45° to the mold parting plane so that the mold cavity and core each have a generally tetrahedron shape. We have found that conforming a parison to mold surfaces oriented obliquely to the mold parting plane allows the maximum lateral excursion of the parison to be more than one-half the narrowest width of each box part—thus exceeding the usual depth-to-width ratio. Moreover, even if the usual depth-to-width ratio were adhered to in molding each diagonal half of a box, the box assembled from such halves can have a depth larger than one-half its width.

We prefer that a junction region between the box halves extend diagonally across the bottom of the box and vertically near opposite corners of the box. We have found that the box halves can be reliably interconnected and that a hinged cover can be trapped between the assembled halves. Each box half can be nearly identical, the corner seams can become part of a design for the box, and producing boxes this way can efficiently overcome the usual limitation on box depth.

DRAWINGS

DETAILED DESCRIPTION

Figure 4:
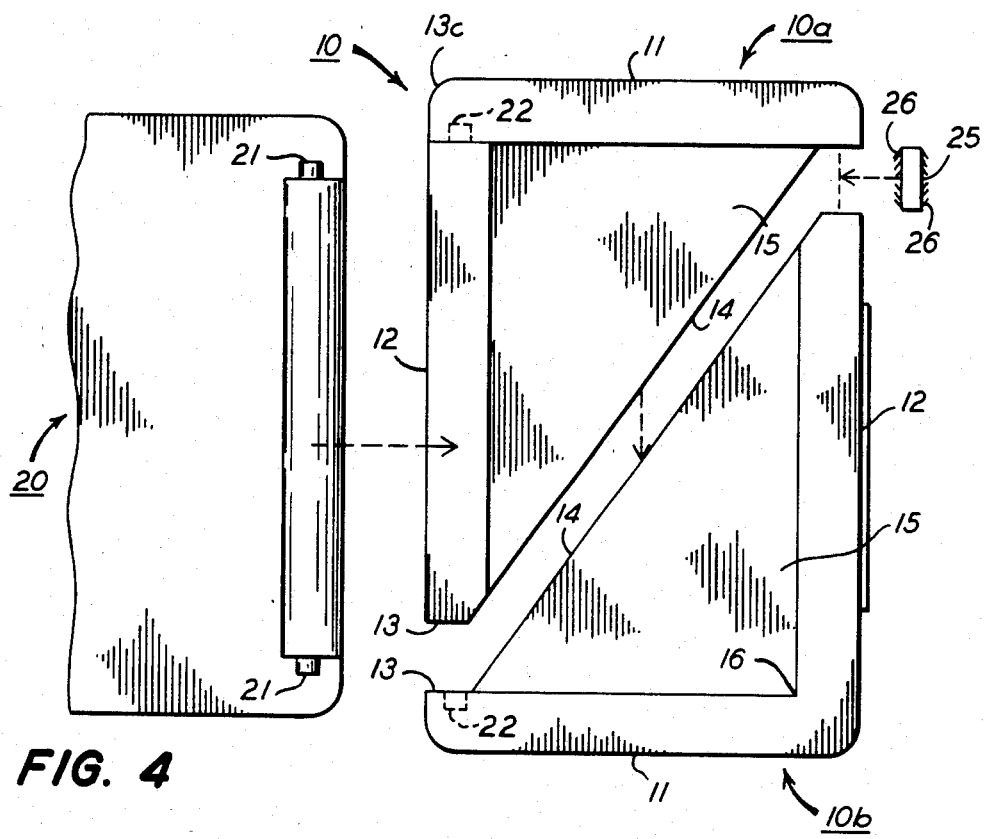
FIG. 4 is an exploded top view of a box formed according to our invention with a hinged cover trapped between diagonal box halves.

By dividing a generally rectangular box 10 into diagonal halves 10a and 10b as shown in FIG. 4, each half includes adjoining sides 11 and 12 subtending a diagonal half of bottom 15. Sides 11 and 12 can be front, rear, or end walls, depending on how box 10 is shaped and intended for use. The diagonal box halves 10a and 10b have walls that abut in a junction region 14 extending diagonally across bottom 15 and in junction regions 13 extending vertically near a pair of opposite corners of box 10. A cover 20 for box 10 has hinge pins 21 that are trapped in hinge sockets 22 formed in each of the box halves 10a and 10b so that cover 20 is hingedly connected to box 10 when the halves are assembled.

Figure 5:
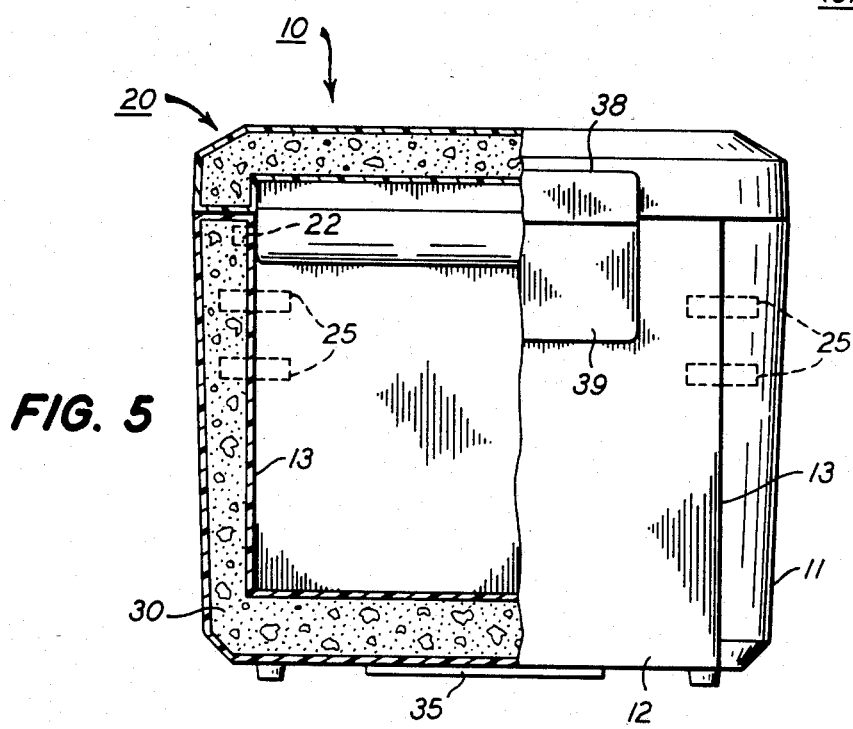
FIG. 5 is a partially sectioned, front elevational view of the box of FIG. 4 fully assembled and filled with fire resistant insulation material.

In fastening together the assembled halves of box 10, several fastener alternatives are possible. For example, fasteners 25, as shown in FIGS. 4 and 5, have retainer barbs 26 arranged to lock into registering holes formed in the adjoining walls of the box halves that abut in junction regions 13 so as to span the junction region and hold the box halves together. Fasteners 25 also preferably interlock with any material filling the cavities between the inner and outer walls of the box halves. This can include fire resistant insulation material 30, or a thermal insulation material, and the choice of filling material affects the structure that is preferred for fasteners 25.

Figure 1:
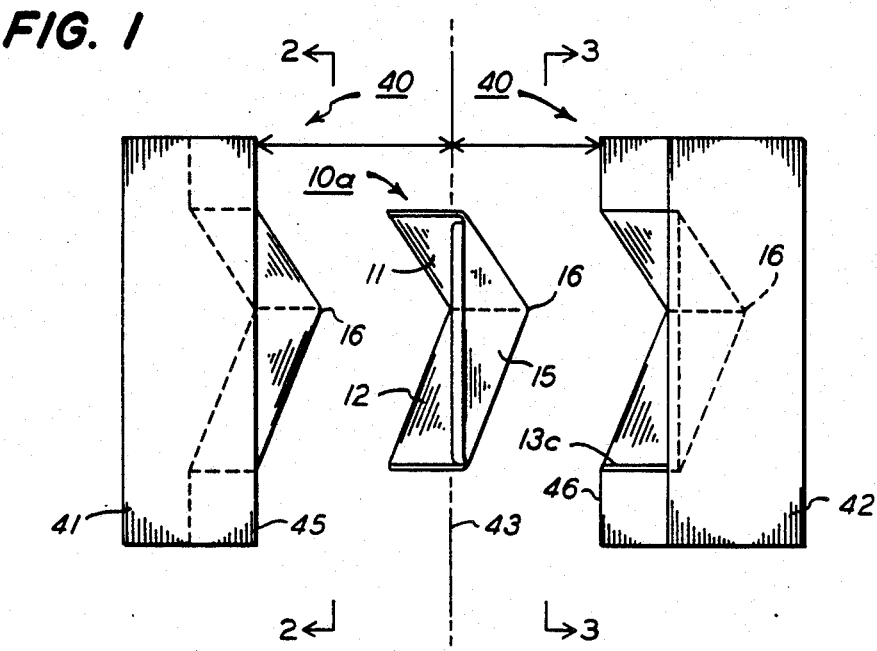
FIG. 1 is a partially schematic elevational view of a mold including a cavity and core and showing a diagonal box half formed between the mold parts.
Figures 2, 3:
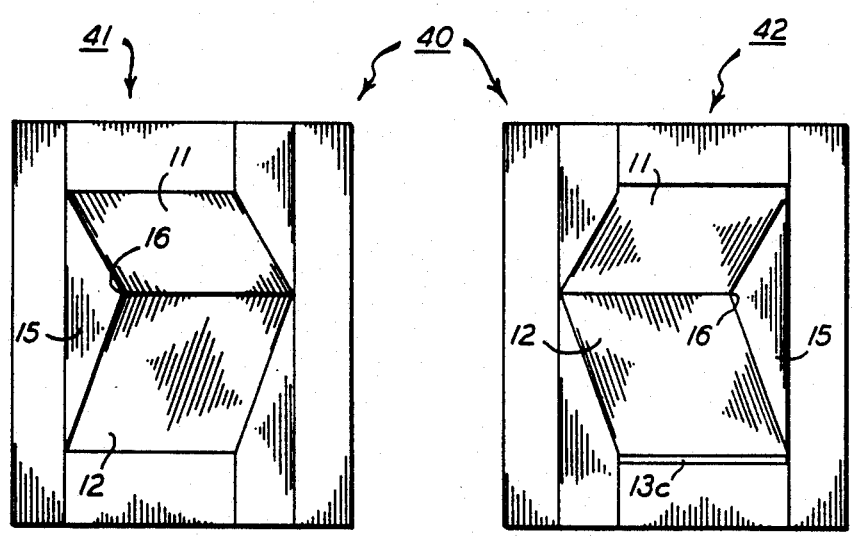
FIG. 2 is a front elevational view of the core portion of the mold of FIG. 1.
FIG. 3 is a front elevational view of the cavity portion of the mold of FIG. 1.

The substantial depth of box 10 is made possible, partly by molding box 10 as a separate pair of diagonal halves 10a and 10b, and partly by orienting the diagonal halves properly relative to the cavity and core of a mold 40 as shown in FIGS. 1-3. The illustration of mold 40 is partially schematic and, for simplicity, leaves out some necessary but generally known features involving lowering a parison between the mold parts, pinching the parison off, blowing it into a box half, and ejecting waste material and the finished part from the mold halves. The parts of the illustrated mold 40 that are important to our invention are the core portion 41, the cavity portion 42, the mold parting plane 43, the mold surfaces 45 and 46 that meet at parting plane 43, and the shape and orientation of the molding surfaces of core 41 and cavity 42 for forming a box half 10a. Double walls 11, 12, and 15 of box half 10a are all oriented obliquely, and preferably at about 45°, to mold parting plane 43. Corresponding surfaces of core 41 form the inside walls of bottom 15 and sides 11 and 12, and corresponding surfaces of cavity 42 form the outside walls of bottom 15 and sides 11 and 12. All these mold surfaces are preferably oriented at about 45° to mold parting plane 43.

Our invention has established that a parison can slide along an oblique mold surface for a greater lateral excursion from mold parting plane 43 than is possible if the parison slides laterally along a wall nearly perpendicular to mold parting plane 43. Thus, the apex 16 of the generally tetrahedral shape of core 41 and the corresponding apex 16 of the negative tetrahedron in cavity 42, which combine to form bottom corner 16 of box half 10a, can be spaced from mold parting surfaces 45 and 46 by more than one-half the narrowest dimension of box half 10a measured along the mold parting plane 43.

The oblique orientation of mold surfaces 11, 12, and 15 to the mold parting plane 43 also eliminates any need for a draw or draft angle in box half 10a. Thus, box walls 11, 12, and 15 can all be perpendicular to each other and can all have inner and outer walls that are parallel, because no taper angle needs to be designed into box part 10a to allow withdrawal of core 41 from cavity 42. In fact, box 10 can even be designed with a bottom 15 larger than the top opening to the box, because the oblique angling of core and cavity mold surfaces would still allow their free separation from molded box half 10a.

To form the box corners 13c along junction regions 13, we prefer an undercut 13c formed in mold cavity 42. Then, instead of having box half 10a stay on core 41 as the mold opens, box half 10a can stay in cavity 42, from where it can be removed by first pivoting wall 11 outward and then lifting corner 13c clear of undercut 13c.

Cover 20 is also preferably blow molded with double walls, the outer of which form hinge pins 21. Sockets or openings 22 formed in box halves 10a and 10b then receive hinge pins 21 as the box halves are assembled with cover 20. At this time, fasteners 25 are secured in registered openings along junction regions 13.

Figure 6:
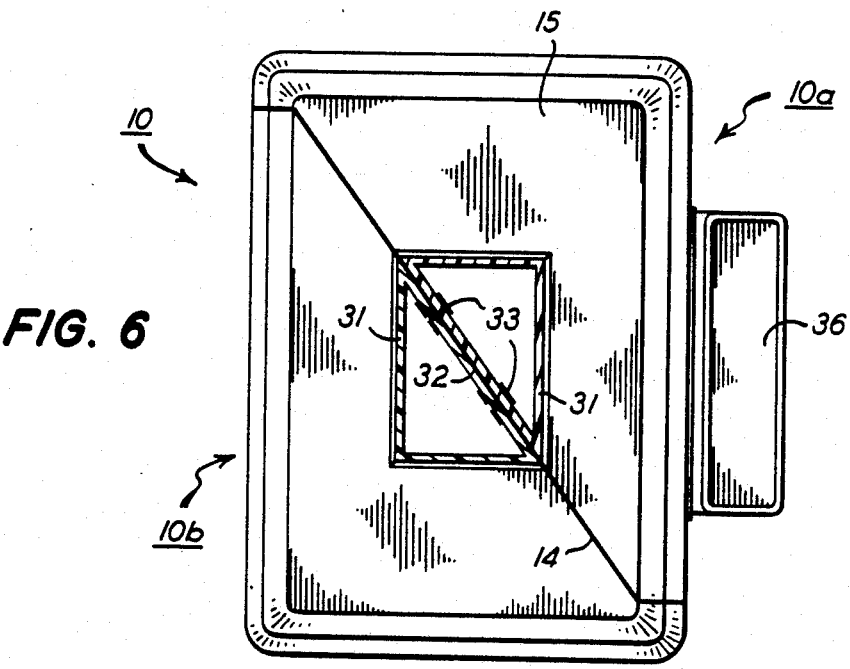
FIG. 6 is a bottom view of the box of FIG. 5 before filling with insulation.
Figure 7:
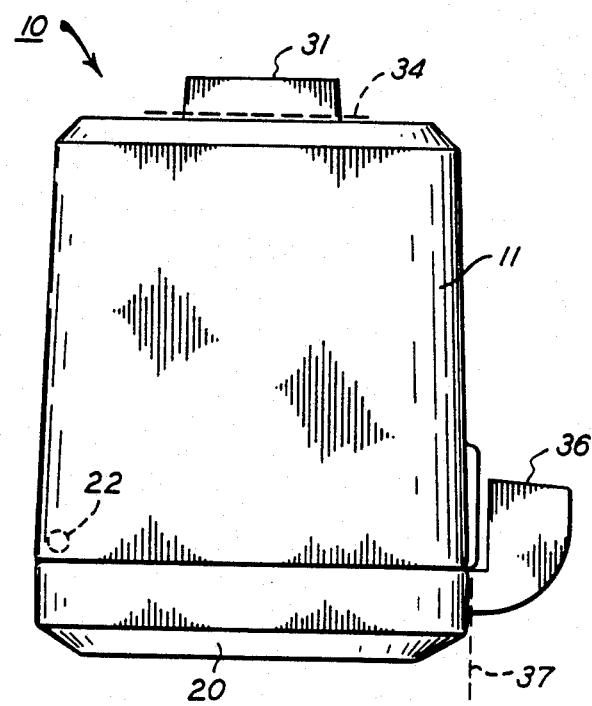
FIG. 7 is a side elevational view of the box of FIG. 6 showing how filling projections are trimmed after the box is filled with fire resistant insulation material.

Box 10 can serve as a fire resistant box, once the interwall cavities of its halves 10a and 10b and its cover 20 are filled with a fire resistant insulation material 30, preferably of a concrete type. This result is shown in FIG. 5, and a preferred way of arranging box 10 to receive the insulation material 30 is shown in FIGS. 6 and 7. Filling projections 31 are preferably formed in the bottom of each box half 10a and 10b so as to straddle the diagonal junction region 14 extending across bottom 15. Within projections 31, the adjoining walls 32 are partially cut away and preferably fastened together with fasteners such as staples 33, or rivets, or clips. Then insulation material 30 can be poured into the opening within projections 31 to flow over junction region 14 and down into the interwall spaces within box halves 10a and 10b to fill these spaces full of insulation material 30. After this has set, projection 31, with any excess insulation material 30 that it contains, is cut away along cut line 34 leaving a severed stub that is capped with a plastic cover 35 to hold the moisture in insulation material 30.

In a similar way, cover 20 has a filling projection 36 that is partially cut away to provide an opening for pouring insulation material 30 into cover 20. After this has set, filling projection 36 is cut off along cut line 37, and the severed stub is covered by an escutcheon 38. A mating escutcheon 39 on box wall 11 forms a decorative front panel that can include a lock.

When its interwall cavities are filled with thermal insulation material, box 10 can serve for hot or cold storage. The interwall spaces of box 10 can also be filled with a material that stiffens and strengthens the box; and for some purposes, these spaces can be left empty.

We claim:

1. A method of making a generally rectangular, double-walled box having a hinged cover, a bottom, and opposed sides and ends arranged with a depth-to-width ratio of greater than 0.5, said method comprising:
   a. molding said cover and separately blow molding halves of said box so that each of said halves includes an adjoining side and end subtending a diagonal half of said bottom;
   b. positioning said cover between siad molded box halves, and juxtaposing said halves to hingedly trap said cover between said halves; and
   c. joining said juxtaposed halves together to retain said cover between said halves for hingedly moving open and closed, said blow molding including blow molding said halves in an orientation within a mold so that said side, end, and bottom are all angled obliquely to a mold parting plane.

2. The method of claim 1 wherein said side, end, and bottom are angled about 45° to said mold parting plane.

3. The method of claim 1 including forming inner and outer walls of said sides and ends to be parallel with each other and perpendicular with said bottom.

4. The method of claim 1 including providing a tooling with a shape for molding said box halves with an undercut formed along a corner edge in a region where sides and ends of said halves join together.

5. The method of claim 4 including separating a core portion of said tooling from a cavity portion of said tooling containing a blow molded box half within said undercut corner edge and then removing said blow molded box half from said cavity portion.

6. The method of claim 1 including forming each of said halves with a filling projection adjacent a diagonal edge of said bottom and cutting away a portion of each of said filling projections to form a common filling projection straddling said diagonal edge of said bottom when said halves are joined together.

7. The method of claim 1 including blow molding said cover with double walls having a filling projection oriented for filling said cover after said cover is hingedly trapped between said halves.

8. The method of claim 1 including forming inner and outer walls of said halves without any draw angle.

9. A method of making a generally rectangular, double-walled box having a hinged cover, a bottom, and opposed sides and ends arranged with a depth-to-width ratio of greater than 0.5, said method comprising:
   a. molding said cover and separately blow molding halves of said box so that each of said halves includes an adjoining side and end subtending a diagonal half of said bottom;
   b. providing a pair of hinge pins on opposite end regions of said cover and providing a pair of sockets on regions of said halves that confront said opposite end regions of said cover;
   c. positioning said cover between said molded box halves to align said hinge pins and sockets at said opposite end regions of said cover and said confronting regions of said halves and juxtaposing said halves to mate said hinge pins and sockets together for hingedly trapping said cover between said halves; and
   d. joining said juxtaposed halves together to retain said cover between said halves for hingedly moving open and closed.

10. The method of claim 9 including forming a junction region between said halves to extend diagonally across said bottom and upward from said bottom along corner regions between said sides and ends.

11. The method of claim 10 including arranging interlocking connectors between said halves along said junction region.

12. The method of claim 9 including forming inner and outer walls of said halves without and draw angle.

13. The method of claim 9 including blow molding said halves in an orientation within a mold so that said side, end, and bottom are all angled obliquely to a mold parting plane.

14. The method of claim 13 wherein said side, end, and bottom are angled about 45° to said mold parting plane.

15. The method of claim 13 including forming inner and outer walls of said sides and ends to be parallel with each other and perpendicular with said bottom.

16. The method of claim 9 including providing a tooling with a shape for molding said box halves with an undercut formed along a corner edge in a region where sides and ends of said halves join together.

17. The method of claim 16 including separating a core portion of said tooling from a cavity portion of said tooling containing a blow molded box half within said undercut corner edge and then removing said blow molded box half from said cavity portion.

18. The method of claim 9 including forming each of said halves with a filling projection adjacent a diagonal edge of said bottom and cutting away a portion of each of said filling projections to form a common filling projection straddling said diagonal edge of said bottom when said halves are joined together.

19. The method of claim 9 including blow molding said cover with double walls having a filling projection oriented for filling said cover after said cover is hingedly trapped between said halves.

* * * * *